US010161632B2

(12) United States Patent
Wünning et al.

(10) Patent No.: US 10,161,632 B2
(45) Date of Patent: Dec. 25, 2018

(54) RECUPERATOR BURNER WITH AUXILIARY HEAT EXCHANGER

(71) Applicant: WS Wärmeprozesstechnik GmbH, Renningen (DE)

(72) Inventors: Joachim G. Wünning, Leonberg (DE); Joachim A. Wünning, Leonberg (DE)

(73) Assignee: WS Wärmeprozesstechnik GmbH, Renningen (DE)

( * ) Notice: Subject to any disclaimer, the term of this patent is extended or adjusted under 35 U.S.C. 154(b) by 79 days.

(21) Appl. No.: 15/120,455

(22) PCT Filed: Feb. 16, 2015

(86) PCT No.: PCT/EP2015/053241
§ 371 (c)(1),
(2) Date: Aug. 19, 2016

(87) PCT Pub. No.: WO2015/124539
PCT Pub. Date: Aug. 27, 2015

(65) Prior Publication Data
US 2017/0067634 A1    Mar. 9, 2017

(30) Foreign Application Priority Data
Feb. 21, 2014  (EP) ..................................... 14156188

(51) Int. Cl.
*F23C 3/00* (2006.01)
*F23D 14/66* (2006.01)
(Continued)

(52) U.S. Cl.
CPC .............. *F23L 15/04* (2013.01); *F23C 3/002* (2013.01); *F23D 14/12* (2013.01); *F23D 14/66* (2013.01);
(Continued)

(58) Field of Classification Search
CPC ........... F23D 14/66; F23C 3/002; F23L 15/04
See application file for complete search history.

(56) References Cited

U.S. PATENT DOCUMENTS 4,192,260 A * 3/1980 Ostbo ...................... F22B 7/12
122/121
4,298,333 A * 11/1981 Wunning ................ F23C 3/002
431/11
(Continued)

FOREIGN PATENT DOCUMENTS

DE    1232304 B     1/1967
DE    4138434 C1   12/1992
(Continued)

OTHER PUBLICATIONS

International Search Report in corresponding International Application No. PCT/EP2015/053241, 6 pages.

*Primary Examiner* — Kenneth Rinehart
*Assistant Examiner* — Deepak Deean
(74) *Attorney, Agent, or Firm* — Fitch, Even, Tabin & Flannery LLP

(57) ABSTRACT

To improve the efficiency of recuperator burners, preferably to over 80%, a recuperator burner (10) is equipped with an auxiliary heat exchanger (26) which surrounds the recuperator (22), wherein both the recuperator and the auxiliary heat exchanger are preferably formed as purely counterdirectional-flow heat exchangers, wherein the auxiliary heat exchanger (26) has the air supplied to it on the side facing toward the furnace wall (11). The housing (15) around the auxiliary heat exchanger (26) can be cooled with cool air from the inside. In one configuration, the air is initially conducted to a flange cooler (45) to protect the region of the flange (16) against the exhaust-gas temperature. For example, the ceramic recuperator pipe (26) is resiliently pressed, and sealed off, against an outlet-side surface (35) of (Continued)

the auxiliary heat exchanger (26), which preferably has gap-like air ducts (39) formed in flattened pipes (40).

11 Claims, 3 Drawing Sheets

(51) Int. Cl.
*F23L 15/04* (2006.01)
*F23D 14/12* (2006.01)

(52) U.S. Cl.
CPC ... *F23C 2900/99001* (2013.01); *Y02E 20/342* (2013.01); *Y02E 20/348* (2013.01)

(56) References Cited

U.S. PATENT DOCUMENTS

| | | | | |
|---|---|---|---|---|
| 4,306,858 A | * | 12/1981 | Simon | F23D 14/66 432/209 |
| 4,392,818 A | * | 7/1983 | Wunning | F23L 15/04 431/11 |
| 4,401,099 A | * | 8/1983 | Collier | F23C 3/002 126/91 A |
| 4,410,037 A | * | 10/1983 | Biro | F23L 15/04 165/142 |
| 4,589,844 A | * | 5/1986 | Loukas | F23C 3/002 126/91 A |
| 4,705,022 A | * | 11/1987 | Collier | F23C 3/002 126/91 A |
| 5,344,310 A | | 9/1994 | Harbeck et al. | |
| 5,833,450 A | | 11/1998 | Wunning | |
| 6,033,208 A | * | 3/2000 | Wunning | F23L 15/02 126/91 A |
| 6,872,070 B2 | * | 3/2005 | Moore | F23C 3/002 126/91 A |
| 7,196,263 B2 | * | 3/2007 | Fraas | F23C 3/002 136/244 |
| 8,622,736 B2 | * | 1/2014 | Wunning | F23D 14/66 165/125 |
| 2002/0179137 A1 | * | 12/2002 | Fraas | H02S 10/30 136/244 |
| 2003/0075214 A1 | * | 4/2003 | Fraas | F23C 3/002 136/253 |
| 2005/0014102 A1 | * | 1/2005 | Harbeck | F23D 14/66 431/215 |
| 2010/0112502 A1 | * | 5/2010 | Wunning | F23D 14/66 431/215 |

FOREIGN PATENT DOCUMENTS

| | | |
|---|---|---|
| DE | 19541922 A1 | 5/1997 |
| EP | 0109146 A1 | 5/1984 |
| EP | 1076207 A1 | 2/2001 |
| EP | 1995516 A1 | 11/2008 |

* cited by examiner

RECUPERATOR BURNER WITH AUXILIARY HEAT EXCHANGER

CROSS REFERENCE TO RELATED APPLICATIONS

This patent application is the national phase of PCT/EP2015/053241 filed Feb. 16, 2015, which claims the benefit of European Patent Application No. 14156188.6 filed Feb. 21, 2014.

TECHNICAL FIELD

The invention relates to a recuperator burner that is suitable in particular for use in industrial furnaces.

BACKGROUND

In fuel-fired, in particular gas-fired, industrial furnaces it is possible to partially recover the flue gas heat by preheating the air.

Regarding this, document DE 195 419 22 A1 describes a burner with a ceramic recuperator that has the form of a tube-shaped ceramic element. The latter is provided on the pipe outside as well as on the pipe inside with pin-like projections that are disposed to enlarge the surface of the recuperator pipe. Flue gas flows around the outside of the recuperator pipe. Air to be heated flows in opposite direction on the inside of the recuperator pipe into the furnace chamber. With such a ceramic recuperator acting as a counter-flow heat exchanger it is possible to recover flue gas heat from very hot flue gases having a temperature of 1250° C., for example. Experience has shown that a combustion-specific efficiency of 65% to 70% is achieved.

From document DE 1232304 A a recuperator burner for heating a radiant pipe has been known, in which case this recuperator burner comprises a heat exchanger that is perfused by fresh air for cooling the wall-side flange and the wall, said heat exchanger concentrically enclosing the recuperator pipe.

Furthermore, from document EP 1 995 516 B1 a recuperator burner has been known, wherein said burner comprises a manifold of flattened fresh-air conducting pipes disposed for preheating the air, said manifold of pipes being arranged in an annular chamber in an flue gas flow leaving the furnace chamber. With the use of this recuperator it is possible to improve the preheating of the air and increase the efficiency to over 80%. However, the use is limited to flue gas temperatures up to approximately 1000° C. Therefore, in particular considering low-efficiency industrial burners of under 200 kW, the object to be achieved is a high combustion-specific efficiency at justifiable expense and at high flue gas temperatures.

SUMMARY

The recuperator burner comprises a heat recovery arrangement comprising a recuperator and an auxiliary heat exchanger enclosing the recuperator in a ring-like manner, wherein the recuperator, as well as the auxiliary heat exchanger, are respectively perfused sequentially by fresh air. In doing so, the inflowing fresh air is first heated by the auxiliary heat exchanger and then by the recuperator. Outflowing flue gas is first cooled in the recuperator and then in the auxiliary heat exchanger.

By splitting the heat recovery arrangement in two differently configured heat exchangers, namely a recuperator that is suitable for high temperatures and an auxiliary heat exchanger that is suitable for less high temperatures and designed for maximum efficiency, a heat exchanger recovery arrangement is obtained that is suitable for hot gas and also makes possible a high combustion-specific efficiency of over 80%. Furthermore, in order to achieve this object, the recuperator is arranged in a central passage of the ring-shaped auxiliary heat exchanger. The still hot flue gasses exiting on one end of the recuperator perfuse the auxiliary heat exchanger in another, preferably counter-directional, direction. Unused heat losses, i.e., heat radiation into the environment, can thus be minimized. Furthermore, this measure contributes to the compact structural design of the burner, in particular in the region of the burner head. A considerable portion of the recuperator is arranged in the burner head. Consequently, this allows structural designs in which the recuperator does not or only minimally extend through the furnace wall.

The directions of flow of air supplied to the burner are likewise different in the auxiliary heat exchanger and the recuperator, preferably they are counter-directional. This makes it possible to supply fresh air to the heat exchanger recovery arrangement in the vicinity of the furnace wall in order to provide cooling effects at that location. For example, the burner flange can be cooled and, at this location, heat extracted from the system can be returned to the system. This is of particular advantage with radiant pipes, in that it is possible to maintain the relatively hot flange of the radiant pipe extending through the furnace wall at tolerable temperatures.

It is possible to provide a bypass duct for the flange cooler so that only a portion of the total air supplied to the burner flows through the flange cooler and another portion is directly supplied to the heat exchanger arrangement.

Considering a preferred embodiment, the auxiliary heat exchanger has a specific heat transfer surface of at least 0.04 $m^2/kW$. Preferably, this is accomplished with a counter-flow heat exchanger of metal pipes or also metal sheets. With the use of this specific heat transfer surface of the auxiliary heat exchanger it is possible—in interaction with a recuperator of ceramic or metal—to achieve a combustion-specific efficiency of more than 80%.

Preferably, the auxiliary heat exchanger comprises several air ducts arranged parallel to each other. For example, these may be pipes arranged in a flue gas duct. In particular flat pipes with noncircular air ducts are considered as pipes. Preferably, the flat pipes have gap-like ducts in order to attain a high surface/volume ratio. A thusly configured heat exchanger of metal can achieve a high transfer efficiency with a small structural volume.

The annular auxiliary heat exchanger may be one structural unit or it may consist of several segment-like structural units that, together, result in the annular heat-exchanger. Instead of a closed ring arrangement, the heat exchanger may also have the form of a ring with slits or of a partially open ring.

Preferably, the recuperator is formed by a pipe through which or around which flows air on the inside and flue gas on the outside, said pipe consisting of ceramic or of a metal that is resistant to high temperatures.

The recuperator that extends through the auxiliary heat exchanger is preferably resiliently pressed and sealed against a seat provided on the auxiliary heat exchanger. For maintenance, the recuperator may be deinstalled in a simple manner. Furthermore, it may be retained at low tension as a result of this.

Furthermore, due to the concept according to the invention, the heat exchanger arrangement can be provided in a housing that is perfused by fresh air and can thus be kept at low temperatures. The fresh air conducted through the housing can be supplied to the heat exchanger arrangement.

Additional details of advantageous embodiments of the invention can be inferred from the description or the claims and the drawings. They show in

DETAILED DESCRIPTION

Figure 1:
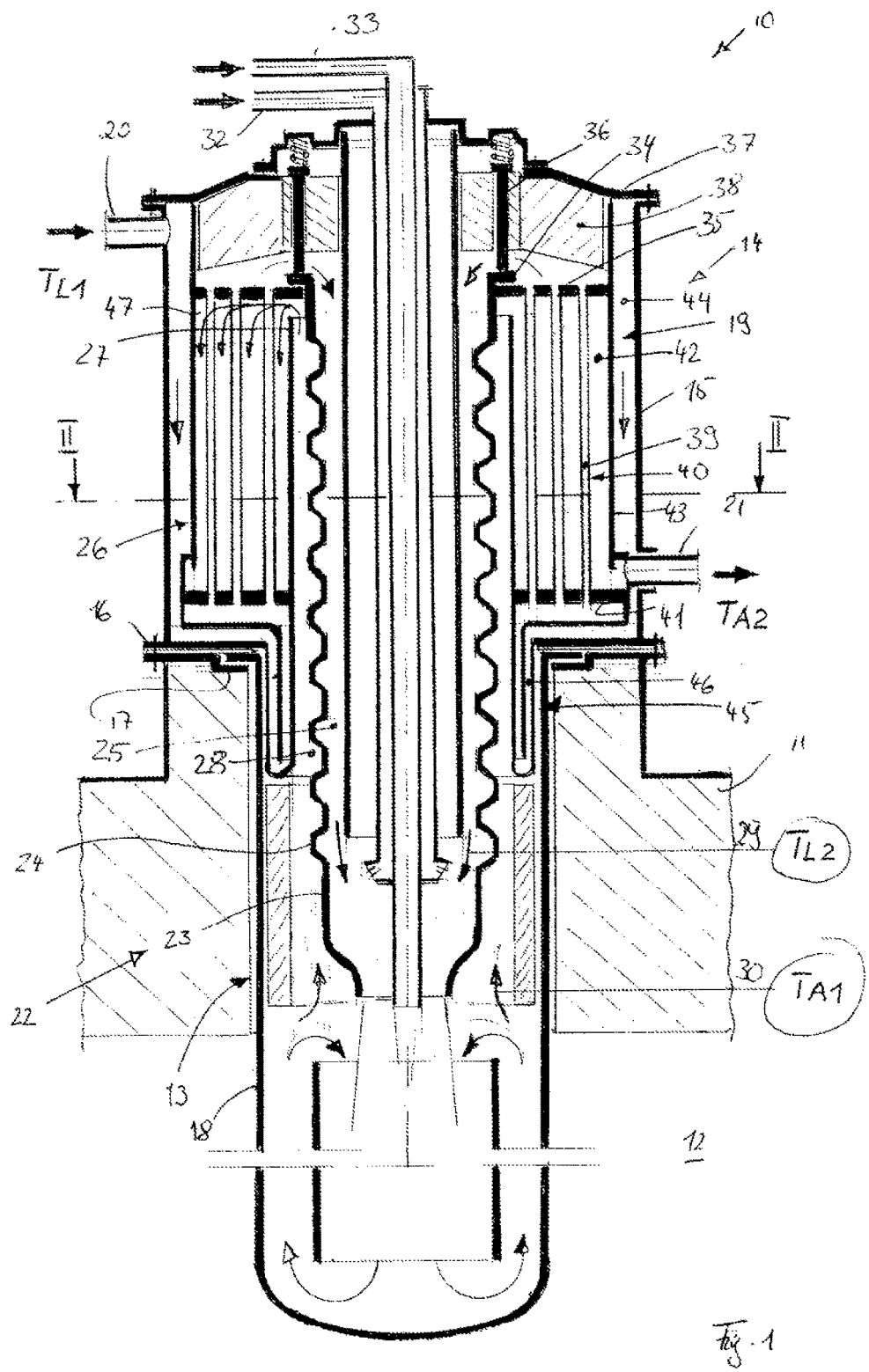
FIG. 1 a simplified longitudinal sectional view of an inventive recuperator burner on a furnace wall.
Figure 2:
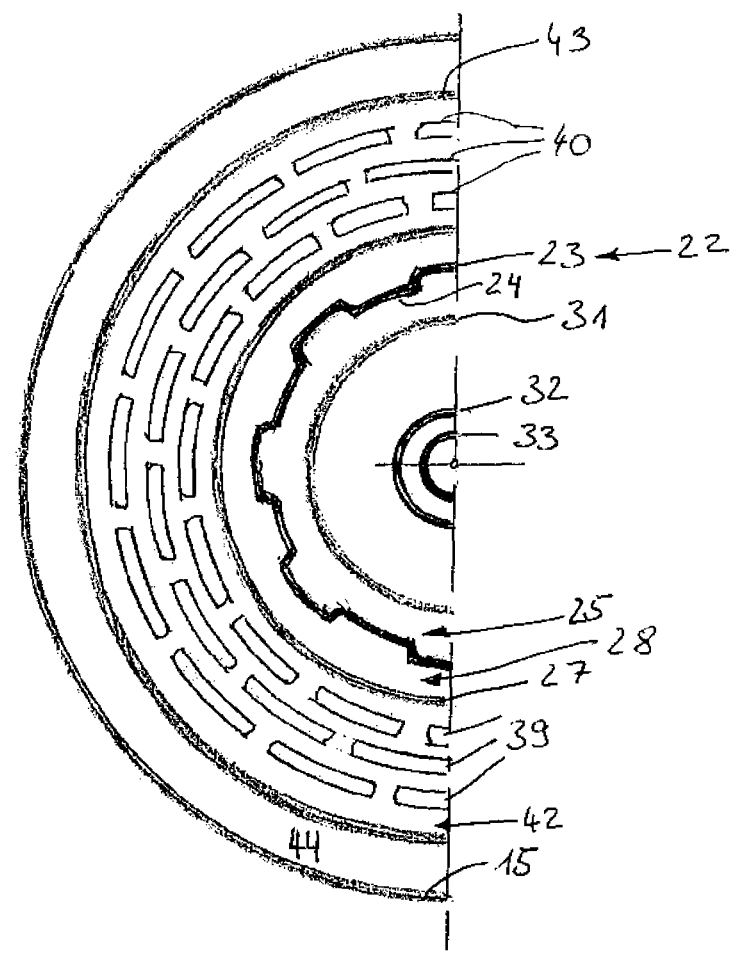
FIG. 2 a cross section, along sectional line II-II, of the recuperator burner according to FIG. 1.

FIG. 1 shows a recuperator burner 10 that is disposed for heating a furnace chamber 12 enclosed by a furnace wall 11. The burner 10 extends through an opening 13 provided in the furnace wall 11, in which case the recuperator burner 10 is mounted to said opening. The recuperator burner 10 comprises a burner head 14 whose housing 15 is held by a flange 16 on the furnace wall 11. On the end of the opening 13 facing away from the furnace chamber 12, there is provided a seat 17 for the accommodation of a flange of a radiant pipe 18 that extends through the opening 13 and is disposed to emit radiant heat into the furnace chamber 12. Preferably, the radiant pipe 18 is heated from the inside by flameless oxidation, however, is optionally also heated otherwise.

The housing 15 encloses a chamber in which a heat exchanger arrangement 19 is provided. Said heat exchanger arrangement is disposed to heat—by means of flue gas heat—fresh air that is supplied to the housing 15 through an air connection 20. As a result of this, the flue gas loses heat and leaves the heat exchanger arrangement 19, as well as the housing 15, at a flue gas connection 21.

The heat exchanger arrangement 19 comprises a recuperator 22 with a recuperator pipe 23 that extends preferably coaxially to the radiant pipe 18—at least in part—into said pipe. The recuperator pipe 23 may be a metal pipe or also a ceramic pipe that is designed for high flue gas temperatures. It may be configured as a smooth-walled cylindrical pipe or, as illustrated, as a profiled pipe with projections 24 that project radially toward the inside and/or toward the outside, for example in the form of hollow prongs or the like. The inside of the recuperator pipe 23 encloses an air duct 25.

On the outside, the recuperator 22 is enclosed by an auxiliary heat exchanger 26 whose tubular inside wall 27, together with the recuperator pipe 23, delimits a flue gas duct 28. The flue gas duct 28 and the air duct 25 are perfused counter-directionally. The direction of flow in the air duct 25 is defined from the burner head 14 toward the radiant pipe 18 (arrow 29), whereas the direction of flow of the flue gas is defined out of the radiant pipe 18 toward the burner head 14 (arrow 30).

Viewed radially toward the inside, the air duct 25 of the recuperator 22 is separated by a pipe 31 from one or more gas lines 32, 33 or any fuel lines that allow different operating modes such as firing operation or flameless operation.

On its end remote from the radiant pipe 18, the recuperator pipe 23 has a flange 34 or another connection by means of which said pipe is held in a seat of the auxiliary heat exchanger 26. The seat may be a plane, conical or otherwise configured annular surface on an upper housing surface 25 of the auxiliary heat exchanger 26. Preferably, the flange 34 is pressed by resiliently tensioned bolts 36 or similar means against the seat. The bolts 36 may extend through an isolator body 38 held by a housing cover 37. When the housing cover 37 is removed, the flange 34 of the recuperator pipe 23 is exposed, so that said pipe is accessible for maintenance and inspection purposes.

The auxiliary heat exchanger 26 comprises at least one, preferably several, air ducts 39 that are enclosed by flattened pipes 40. They extend between the housing surface 35 and a housing floor 41. The pipes 40 may have round ends in order to be held in a sealed manner in the plate or surface 35 and the floor 41 in round openings. In a section in between, however, the pipes 40 are preferably flattened so that the air ducts 39 are configured in a gap-like manner. Preferably, the gap width is limited to a value of less than 3 mm in order to achieve a strong thermal contact between the air and the pipe wall.

The pipes 39 are arranged in a flue gas duct 42 of the auxiliary heat exchanger 26, through which flows flue gas in a direction away from the isolator body 38 toward the housing floor 41. Fresh air counter-directionally perfuses the pipes 40. On the outside, the flue gas duct 42 is enclosed by a circumferential wall 43 that, together with the housing 15, delimits a fresh air duct 44. The latter leads to a flange cooler 45. The flange cooler 45 comprises an air duct 46 that extends past the flange of the radiant pipe 18 into said radiant pipe and from there toward the auxiliary heat exchanger 26.

Figure 3:
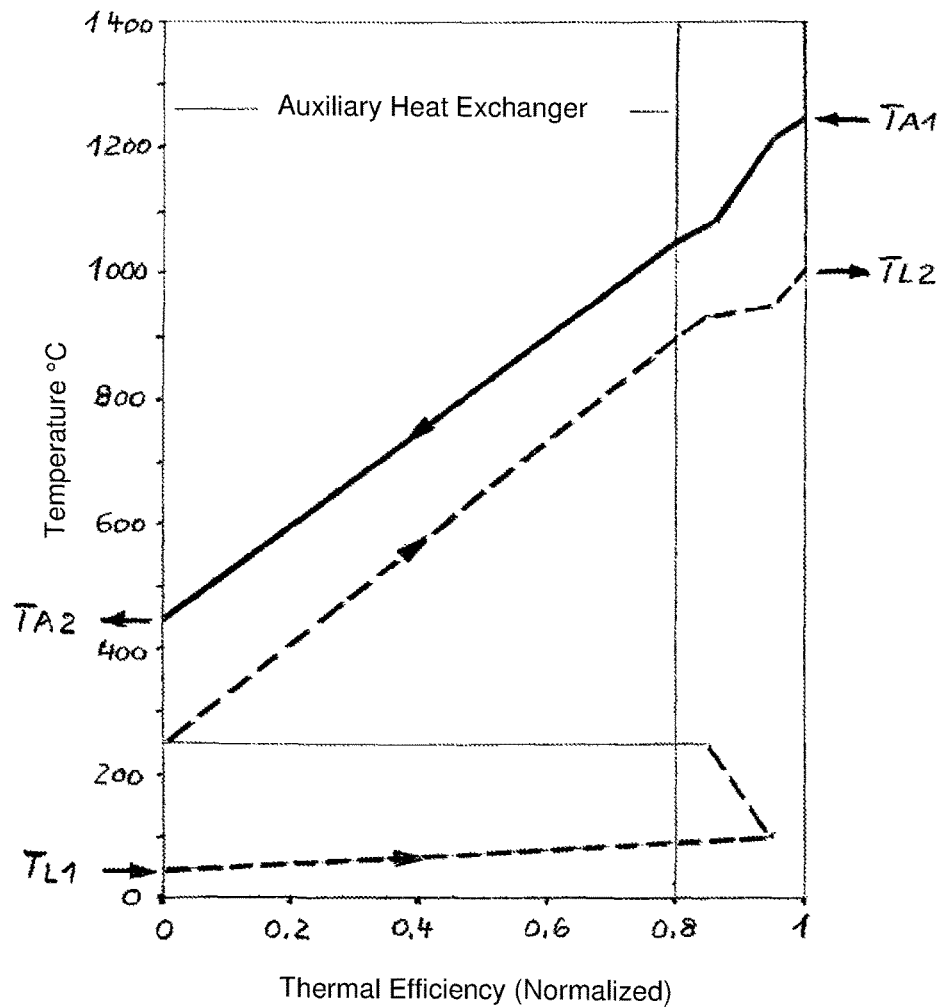
FIG. 3 a diagram to illustrate the heat capacity and temperature curve of the heat exchanger arrangement of the inventive recuperator burner.

The so far described recuperator burner operates as follows:

For startup, air is fed to the air connection 20 and, initially, fuel—for example gas—is fed to the fuel line 32. The gas ignites a flame in the radiant pipe end of the recuperator pipe 23 by means of an appropriate ignition device that is disposed to heat up the inside of the radiant pipe. Once this has been done, gas is introduced into the fuel line 33 and the gas supply to the fuel line 32 is gradually reduced and switched off. A large-size hot gas vortex indicated by arrows in FIG. 1 forms, and fuel and air are introduced into said vortex in order to oxidize in a flameless manner. Temperatures preferably above 1000° C. prevail in the radiant pipe 18. Flue gas having a flue gas temperature $TA_1$ of 1250° C., for example, flows along the outside of the recuperator pipe 23 through the flue gas duct 28. FIG. 3 shows the temperature gradient of the flue gas on the recuperator pipe 18. On the open end of the inside wall 27, the slightly cooled flue gas leaves the flue gas duct 28 while changing its direction in the flue gas duct 28 of the auxiliary heat exchanger 26 (FIG. 1, arrow cluster 47). The flue gas then flows through the flue gas duct 42 along the pipes 40 to the connection 21 and leaves the connection 21 at that location—clearly cooled—at a temperature of 450° C., for example.

The fresh air that has, for example, the environmental temperature $TL_1$ (20° C.) and is supplied to the connection 20 initially warms up only slightly in the fresh air duct 44. It reaches, at a slightly elevated temperature of 50° C. for example, the flange cooler 45 and then enters heated to 250° C., for example, the air ducts 39 of the auxiliary heat exchanger 26. Here, it is heated to 900° C., for example, on its way away from the flange of the radiant pipe 18, whereupon it flows—while changing its direction—into the air duct 25 of the recuperator 22. As a result of its high temperature existing already at this point, the thermal tensions occurring on the recuperator pipe 22 are kept to a minimum.

On its way through the air duct 25, the air is further heated to 1000° C., for example. The table hereinafter provides a comparison of the inventive recuperator burner 10 described so far as an example featuring a net output of 60 kW with a conventional recuperator burner without auxiliary heat exchanger.

|  |  | Recuperator Burner | |
| --- | --- | --- | --- |
|  |  | 1. Without aux. heat exchanger | With aux. heat exchanger |
| Heat transfer surface | m² | 1 | 1 + 3.5 |
| Flue gas entry temperature TA1 | ° C. | 1250 | 1250 |
| Air entry temperature TL1 | ° C. | 50 | 50 |
| Flue gas exit temperature TA2 | ° C. | 750 | 450 |
| Air preheating TL2 | ° C. | 640 | 1000 |
| Combustion-specific efficiency | % | 65 | 81 |
| Fuel requirement | kW | 92 | 74 |
| Savings | % | — | 19.5 |
| Natural gas savings at 10 kWh/m³ | m³/h | — | 1.8 |

The increase of the combustion-specific efficiency from 65% to 81% causes a clear reduction of the fuel requirement. At 5000 operating hours per year, this results in a savings of 9000 m³ of natural gas.

In order to improve the efficiency of recuperator burners to preferably over 80% a recuperator burner 10 is equipped with an auxiliary heat exchanger 26 that encloses the recuperator 22, in which case the recuperator, as well as the auxiliary heat exchanger, are preferably designed exclusively as counter-flow heat exchangers, in which case the auxiliary heat exchanger 26 is supplied with air on the side facing the furnace wall 11. The specific heat transfer surface of the auxiliary heat exchanger is preferably greater than 0.04 m²/kW fuel power.

In addition, the housing 15 may be cooled around the auxiliary heat exchanger 26 with cold air from the inside. Furthermore, at least optionally, the air may initially be supplied to a flange cooler 45 in order to protect the flange 16 against the flue gas temperature that is still high at this location. This is advantageous, in particular, with the use of the radiant pipe 18.

Preferably, the ceramic recuperator pipe 26 is resiliently pressed and sealed against an outlet-side surface 35 of the auxiliary heat exchanger 26. This is of benefit during maintenance. The auxiliary heat exchanger 26 preferably has gap-shaped air ducts 39. Preferably, these are formed in flattened pipes 40.

LIST OF REFERENCE SIGNS

10 Recuperator burner
11 Furnace wall
12 Furnace chamber
13 Opening
14 Burner head
15 Housing
16 Flange
17 Seat
18 Radiant pipe
19 Heat exchanger arrangement
20 Air connection
21 Flue gas connection
22 Recuperator
23 Recuperator pipe
24 Projections
25 Air duct of the recuperator 22
26 Auxiliary heat exchanger
27 Inside wall of the auxiliary heat exchanger 26
28 Flue gas duct of the recuperator 22
29 Direction of flow of the air in the recuperator
30 Direction of flow of the flue gas in the recuperator
31 Pipe
32 Fuel line for firing operation
33 Fuel line for flameless operation
34 Flange
35 Housing surface
36 Bolt
37 Housing cover
38 Isolator body
39 Air ducts of the auxiliary heat exchanger 26
40 Pipes
41 Housing floor
42 Flue gas duct of the auxiliary heat exchanger
43 Circumferential wall
44 Fresh air duct
45 Flange cooler
46 Air duct

The invention claimed is:

1. Recuperator burner (10) comprising:
   a burner head (14) comprising a burner flange (16) configured to mount to a furnace wall (11) in such a manner that the burner (10) extends through an opening (13) of the furnace wall (11) into a furnace chamber (12),
   a heat recovery arrangement (19) configured to preheat the burner air by flue gas heat, wherein the heat recovery arrangement (19) comprises a recuperator (22) and an auxiliary heat exchanger (26) enclosing said recuperator in a ring-shaped manner, these being perfused in series,
   wherein the recuperator (22) is a counter-flow heat exchanger that comprises at least one air duct (25) and at least one flue gas duct (28),
   wherein the auxiliary heat exchanger (26) is a counter-flow heat exchanger that comprises at least one flue gas duct (42), several flat pipes (40) with noncircular air ducts (39) that are arranged in the at least one flue gas duct (42), and a seat configured to engage a flange (34) of the recuperator (22) that is resiliently pressed against the seat,
   wherein the flue gas duct (28) of the recuperator (22) and the flue gas duct (42) of the auxiliary heat exchanger (26) exhibit different perfusion flow directions,
   wherein the air duct (25) of the recuperator (22) and the air duct (39) of the auxiliary heat exchanger (26) exhibit different perfusion flow directions,
   wherein the recuperator pipe (23) consists of ceramic,
   wherein the recuperator (22) and the auxiliary heat exchanger (26) consist of different materials.

2. Recuperator burner as in claim 1, wherein the air duct (25) of the recuperator (22) is configured to be perfused by air to be heated in a direction into the furnace chamber (12), and that the flue gas duct (28) of the recuperator (22) is configured to be perfused by flue gas in a direction out of the furnace chamber (12).

3. Recuperator burner as in claim 1, wherein the air duct (39) of the auxiliary heat exchanger (26) is configured to be perfused by air to be heated in a direction away from the furnace wall (11), and that the flue gas duct (42) of the auxiliary heat exchanger (26) is configured to be perfused by flue gas in a direction toward the furnace wall (11).

4. Recuperator burner as in claim 1, wherein the auxiliary heat exchanger (26) has a specific heat transfer surface of at least 0.04 m$^2$/kW.

5. Recuperator burner as in claim 1, wherein the auxiliary heat exchanger (26) has several parallel air ducts (39).

6. Recuperator burner as in claim 1, wherein the recuperator (22) has a recuperator pipe (23) that encloses the air duct (25) of the recuperator (22) and that the flue gas flow is in contact with an outside of said recuperator.

7. Recuperator burner as in claim 1, wherein the recuperator (22) is formed by a profile pipe (23).

8. Recuperator burner as in claim 7, wherein the profile pipe (23) has radially inward-projecting and/or outward-projecting projections (24).

9. Recuperator burner as in claim 1, wherein a flange cooler (45) is arranged on the burner flange (16), said flange cooler comprising a cool air duct (46).

10. Recuperator burner as in claim 9, wherein the cool air duct (46) communicates with the air duct (39) of the auxiliary heat exchanger (26).

11. Recuperator burner as in claim 1, wherein the burner head (14) comprises a housing (15) that encloses a fresh air duct (44).

* * * * *